(12) United States Patent
Abe et al.

(10) Patent No.: US 8,144,934 B2
(45) Date of Patent: Mar. 27, 2012

(54) PHOTOGRAPHIC SUBJECT TRACKING METHOD, COMPUTER PROGRAM PRODUCT AND PHOTOGRAPHIC SUBJECT TRACKING DEVICE

(75) Inventors: Hiroyuki Abe, Yokohama (JP); Maki Suzuki, Tokyo (JP)

(73) Assignee: Nikon Corporation, Tokyo (JP)

( * ) Notice: Subject to any disclaimer, the term of this patent is extended or adjusted under 35 U.S.C. 154(b) by 898 days.

(21) Appl. No.: 12/149,227

(22) Filed: Apr. 29, 2008

(65) Prior Publication Data
US 2008/0285809 A1 Nov. 20, 2008

(30) Foreign Application Priority Data

May 2, 2007 (JP) .................................. 2007-121584
Feb. 29, 2008 (JP) .................................. 2008-049404

(51) Int. Cl.
*G06K 9/00* (2006.01)
(52) U.S. Cl. ...................................... 382/107; 382/100
(58) Field of Classification Search ................. 382/107, 382/100
See application file for complete search history.

(56) References Cited

U.S. PATENT DOCUMENTS

| | | | | |
|---|---|---|---|---|
| 5,946,041 A | * | 8/1999 | Morita | 348/416.1 |
| 6,590,999 B1 | * | 7/2003 | Comaniciu et al. | 382/103 |
| 7,190,811 B2 | * | 3/2007 | Ivanov | 382/103 |
| 7,831,074 B2 | * | 11/2010 | Zhou et al. | 382/128 |
| 2005/0008194 A1 | * | 1/2005 | Sakuma et al. | 382/104 |
| 2006/0109341 A1 | * | 5/2006 | Evans | 348/14.08 |
| 2006/0159310 A1 | * | 7/2006 | Boukerroui et al. | 382/107 |
| 2007/0263904 A1 | * | 11/2007 | Muramatsu | 382/107 |

FOREIGN PATENT DOCUMENTS

JP A-5-81433 4/1993
JP 09130784 A * 5/1997

* cited by examiner

*Primary Examiner* — Andrew W Johns
*Assistant Examiner* — Shefali Goradia
(74) *Attorney, Agent, or Firm* — Oliff & Berridge, PLC

(57) ABSTRACT

A photographic subject tracking method comprises calculating similarity levels of images input sequentially to a template image, determining a photographic subject position in each of the input images based upon the similarity levels, tracking the photographic subject position through the input images, judging whether reliability of the similarity level calculated for the photographic subject position is high or low, and changing ways of at least one of calculating the similarity levels, determining the photographic subject position and tracking the photographic subject position, if the reliability of the similarity level is judged to be low.

6 Claims, 13 Drawing Sheets

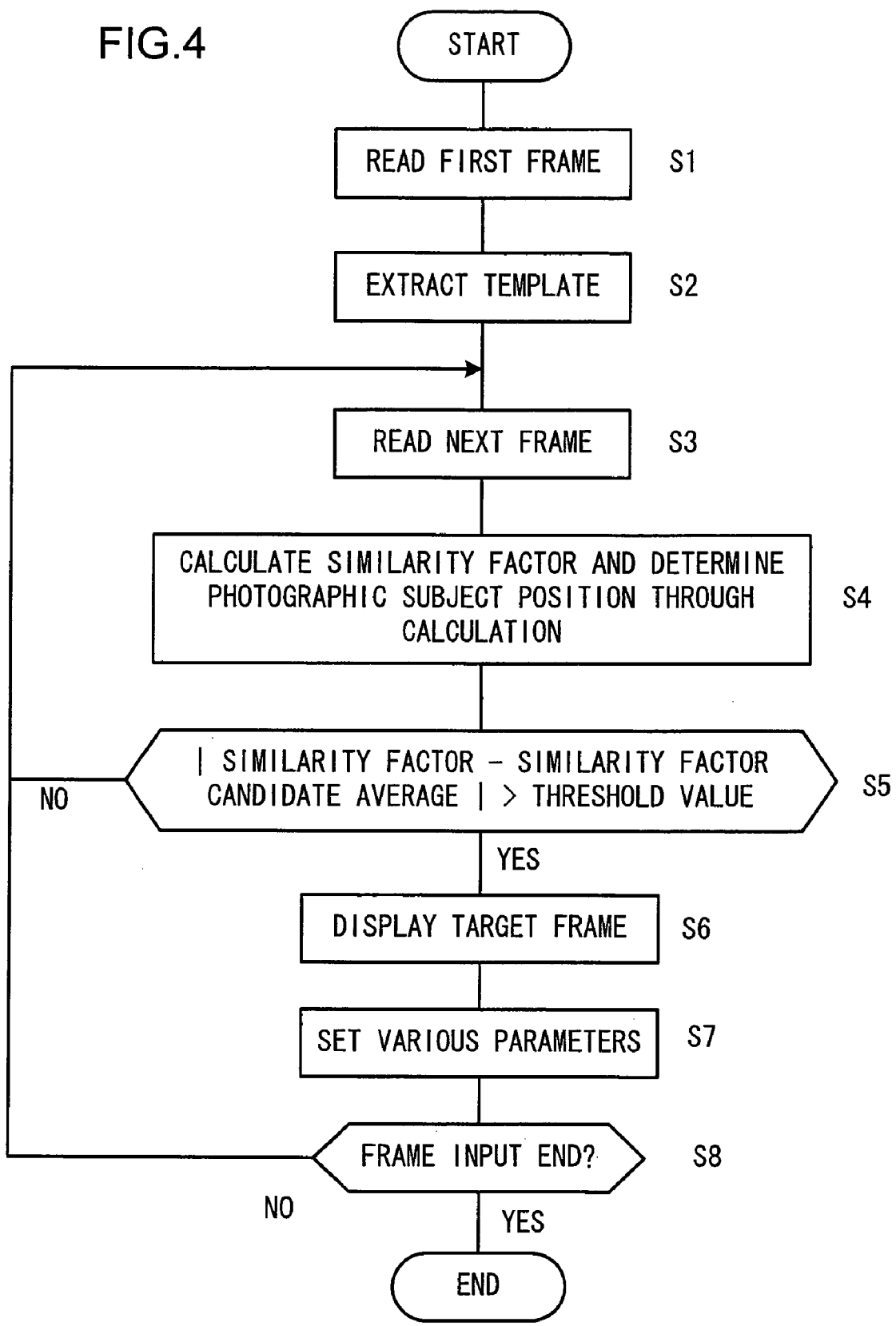

PHOTOGRAPHIC SUBJECT TRACKING METHOD, COMPUTER PROGRAM PRODUCT AND PHOTOGRAPHIC SUBJECT TRACKING DEVICE

INCORPORATION BY REFERENCE

The disclosures of the following priority applications are herein incorporated by reference:
Japanese Patent Application No. 2007-121584 filed May 2, 2007
Japanese Patent Application No. 2006-49404 filed Feb. 29, 2008

BACKGROUND OF THE INVENTION

1. Field of the Invention

The present invention relates to a computer program product containing a photographic subject tracking program used to track a photographic subject from frame to frame and a photographic subject tracking device.

2. Description of Related Art

There is a pattern matching method known in the related art, whereby an image is divided into a plurality of image areas and an area achieving the highest level of similarity, determined through a template matching process executed on the individual areas, is extracted as a matching area (Japanese Patent Application No. H5-81433).

However, if the method in the related art is adopted to determine through template matching a photographic subject position within an image with a background thereof containing an image similar to the template, in order to track the photographic subject position from frame to frame, a false match may occur, disabling accurate subject tracking.

SUMMARY OF THE INVENTION

A photographic subject tracking method according to a first aspect of the present invention comprises calculating similarity levels of images input sequentially to a template image, determining a photographic subject position in each of the input images based upon the similarity levels, tracking the photographic subject position through the input images, judging whether reliability of the similarity level calculated for the photographic subject position is high or low, and changing ways of at least one of calculating the similarity levels, determining the photographic subject position and tracking the photographic subject position, if the reliability of the similarity level is judged to be low.

According to a second aspect of the present invention, in the photographic subject tracking method of the first aspect, the similarity levels may be calculated by setting a search target area in each of the input images, shifting a search frame to a plurality of positions within the search target area and calculating similarity levels of images within the search frame at each of the positions to the template image, and the photographic subject position may be determined to be at a position of the search frame at which a highest similarity level is calculated.

According to a third aspect of the present invention, in the photographic subject tracking method of the second aspect, if an absolute value of a difference between an average of the similarity levels and the highest similarity level is greater than a predetermined threshold value, the reliability can be judged to be high, and if the absolute value of the difference is equal to or less than the threshold value, the reliability can be judged to be low.

According to a fourth aspect of the present invention, in the photographic subject tracking method of the third aspect, if the reliability is judged to be low, it is desirable that the photographic subject position determined in a corresponding input image is disqualified as a tracking target.

According to a fifth aspect of the present invention, in the photographic subject tracking method of the third aspect, if the reliability is judged to be low, it is preferable that an areal size of the search target area over which the search frame is to be shifted during a template matching process executed for a subsequent input image is adjusted in correspondence to the similarity level calculated for the photographic subject position.

According to a sixth aspect of the present invention, in the photographic subject tracking method of the third aspect, if the reliability is judged to be low, an areal size of the search target area over which the search frame is to be shifted may be adjusted in correspondence to the similarity level calculated for the photographic subject position, the similarity level may be recalculated through template matching of the image within the search frame and the template image executed by shifting the search frame within the search target area with the adjusted areal size set within a current input image, and a position of the search frame with a highest recalculated similarity level within the input image may be designated as the photographic subject position.

According to a seventh aspect of the present invention, in the photographic subject tracking method of the second aspect, if an absolute value of a difference between an average of largest similarity levels calculated with previous input images and a largest similarity level calculated with a current input image is greater than a predetermined threshold value, the reliability can be judged to be high, and if the absolute value of the difference is equal to or less than the threshold value, the reliability can be judged to be low.

According to a eighth aspect of the present invention, in the photographic subject tracking method of the seventh aspect, if the reliability is judged to be low, it is preferable that an areal size of the search target area over which the search frame is to be shifted during a template matching process executed for a subsequent input image is expanded.

According to a ninth aspect of the present invention, in the photographic subject tracking method of the seventh aspect, if the reliability is judged to be low, an areal size of the search target area over which the search frame is to be shifted may be expanded, the similarity level may be recalculated through template matching of the image within the search frame and the template image executed by shifting the search frame within the enlarged search target area set within a current input image, and a position of the search frame with the highest recalculated similarity level within the input image may be designated as the photographic subject position.

A computer-readable computer program product according to a tenth aspect of the present invention is for executing a photographic subject tracking method of any one of the first through ninth aspects.

A photographic subject tracking device according to a eleventh aspect of the present invention comprises a similarity level calculation unit that calculates similarity levels of images input sequentially to a template image, a photographic subject position determination unit that determines a photographic subject position in each of the input images based upon the similarity levels, a photographic subject tracking unit that tracks the photographic subject position through the input images, a reliability judgment unit that judges whether reliability of the similarity level calculated for the photographic subject position is high or low, and a processing control unit that changes ways of at least one of the calculation of the similarity levels by the similarity level calculation unit, the determination of the photographic subject position by the photographic subject position determination unit and the tracking of the photographic subject position by the photographic subject tracking unit, if the reliability of the similarity level is judged to be low.

BRIEF DESCRIPTION OF THE DRAWINGS

FIG. 4 presents a flowchart of the processing executed in the camera 100 in the first embodiment;

DETAILED DESCRIPTION OF PREFERRED EMBODIMENTS

-First Embodiment-

Figure 1:
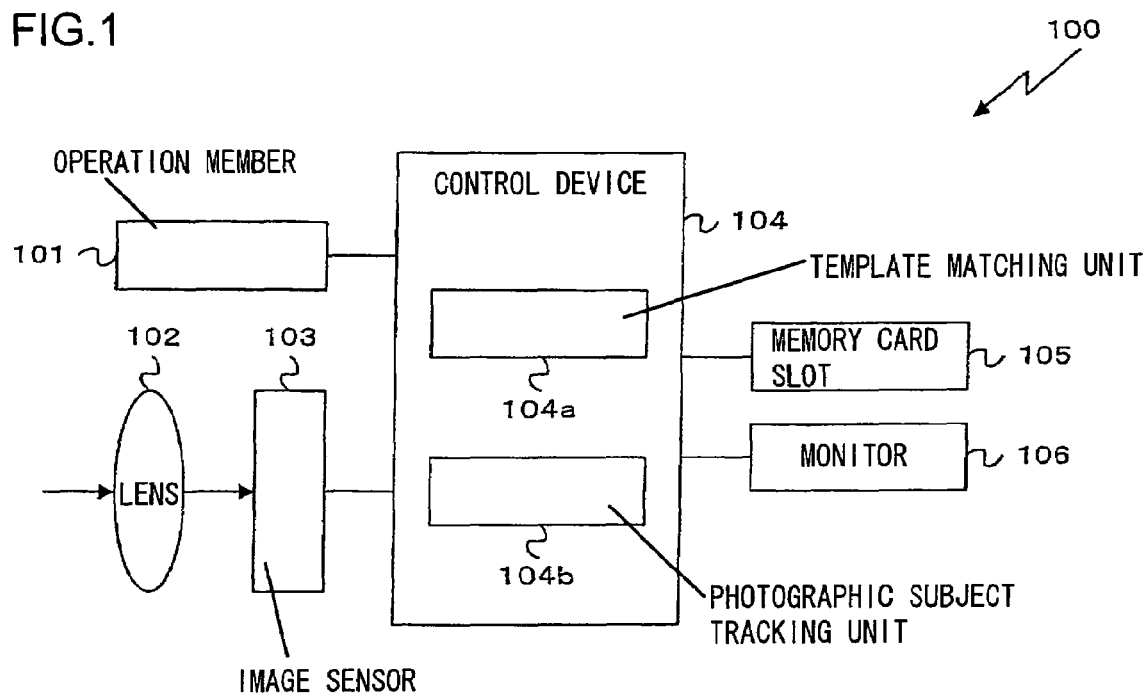
FIG. 1 is a block diagram showing the structure adopted in the camera achieved in an embodiment.

FIG. 1 is a block diagram showing the camera representing the photographic subject tracking device achieved in the first embodiment of the present invention. A camera 100 is equipped with an operation member 101, a lens 102, an image sensor 103, a control device 104, a memory card slot 105 and a monitor 106. The operation member 101 includes various input members operated by the user, such as a power button, a shutter release switch, a zoom button, a cross key, a select button, a playback button and a delete button.

While the lens 102 is constituted with a plurality of optical lens groups, FIG. 1 shows a single representative lens 102. The image sensor 103, which may be constituted with a CCD or a CMOS, obtains an image by capturing a subject image formed through the lens 102. It then outputs the data of the image it has obtained (image data) to the control device 104. The control device 104 compresses the image data having been obtained via the image sensor 103 into a specific image formats such as the JPEG format, generates an image file in a predetermined format such as the Exif (exchangeable image file format for digital still camera) and outputs the image file thus generated to the memory card slot 105.

At the memory card slot 105, where a memory card used as a storage medium is loaded, the image file output from the control device 104 is written and recorded into the memory card. In addition, in response to an instruction output from the control device 104, an image file stored in the memory card is read at the memory card slot.

At the monitor 106, which is a liquid crystal monitor mounted at the rear surface of the camera 100 (rear monitor), an image stored in the memory card, a setting menu in which settings for the camera 100 are selected, and the like are brought up on display. In addition, the control device 104 obtains images from the image sensor 103 in a time sequence and outputs the images thus obtained to the monitor 106. As a result, images each corresponding to a given frame are brought up on display in sequence at the monitor 106 over predetermined time intervals. In other words, through images are brought up on display at the monitor 106.

The control device 104, constituted with a CPU, a memory and other peripheral circuits, includes functional units such as a template matching unit 104a and a photographic subject tracking unit 104b. It is to be noted that the memory in the control device 104 includes a ROM used as a buffer memory, which may be a flash memory, and a RAM such as an SDRAM. The template matching unit 104a in the embodiment executes a template matching process on each of the sequential frames of through images input from the image sensor 103 in order to determine an area over which a photographic subject is photographed within the frame. The photographic subject tracking unit 104b tracks the area thus determined from frame to frame. In more specific terms, the following processing is executed.

Figure 2:
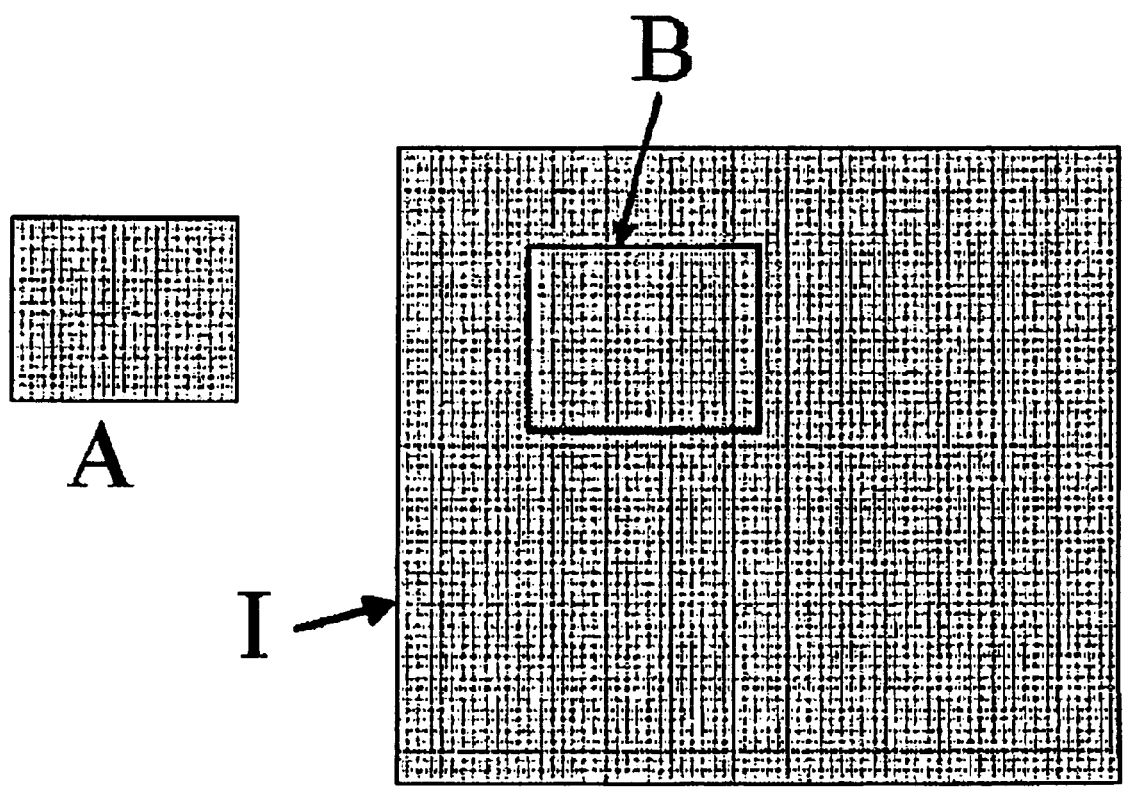
FIG. 2 presents specific examples of the target image I, the template image A and the search frame B.

The template matching unit 104a executes matching calculation to determine a match for a template image used as a reference image in the template matching process in the image data (target image) in each of the frames input from the image sensor 103 in time sequence. More specifically, it determines a photographic subject position within the target image I in reference to the template image A, as shown in FIG. 2. The template image A is obtained based upon an instruction provided by the user. For instance, the user may operate the operation member 101 as a first through image frame is brought up on display at the monitor 106 to specify a range within the first frame containing a photographic subject to be tracked from frame to frame. The template matching unit 104a extracts the image within the range specified by the user as a template image A and stores the extracted template image into the ROM.

As the through image input from the image sensor 103 starts, the template matching unit 104a designates the image in each frame as the target image I and sets a search frame B with an areal size equal to that of the template image at a specific position in the target image I. The template matching unit 104a shifts the search frame B thus set within the target image I and executes the matching calculation to find a match for the template image A among the images (search area images) within the search frame B assuming various positions. Based upon the matching calculation results, it then determines the photographic subject position indicated by the coordinate values taken within the target image I, which correspond to the match area achieving the highest level of similarity between the image in the search frame B and the template image A.

It is to be noted that the template matching unit 104a executes template matching over a specific target range (search target area) containing the position at which the template image A has been extracted, instead of executing template matching over the entire target image I. Through these measures, the template matching range can be restricted to a range likely to contain the photographic subject in the target image I and, as a result, the processing can be executed rapidly. In addition, since the template matching process can be executed by adopting any of the template matching methods known in the related art, a detailed explanation is omitted. For instance, the template matching process may be executed by calculating a similarity factor based on, for instance, the residual sum expressed in (1) below or the normalized correlation expressed in (2) below.

The level of similarity between the template image A and the search area image is higher when r calculated as the similarity factor based upon the residual sum as expressed in (1) below assumes a smaller value. In contrast, the level of similarity between the template image A and the search area image is higher when r calculated as the similarity factor based upon the normalized correlation as expressed in (2) below assumes a greater value.

$$r = \sum_m \sum_n |A_{mn} - B_{mn}| \quad \text{(expression 1)}$$

$$r = \frac{\sum_m \sum_n (A_{mn} - \overline{A})(B_{mn} - \overline{B})}{\sqrt{\left(\sum_m \sum_n (A_{mn} - \overline{A})^2\right)\left(\sum_m \sum_n (B_{mn} - \overline{B})^2\right)}} \quad \text{(expression 2)}$$

Figure 3A:
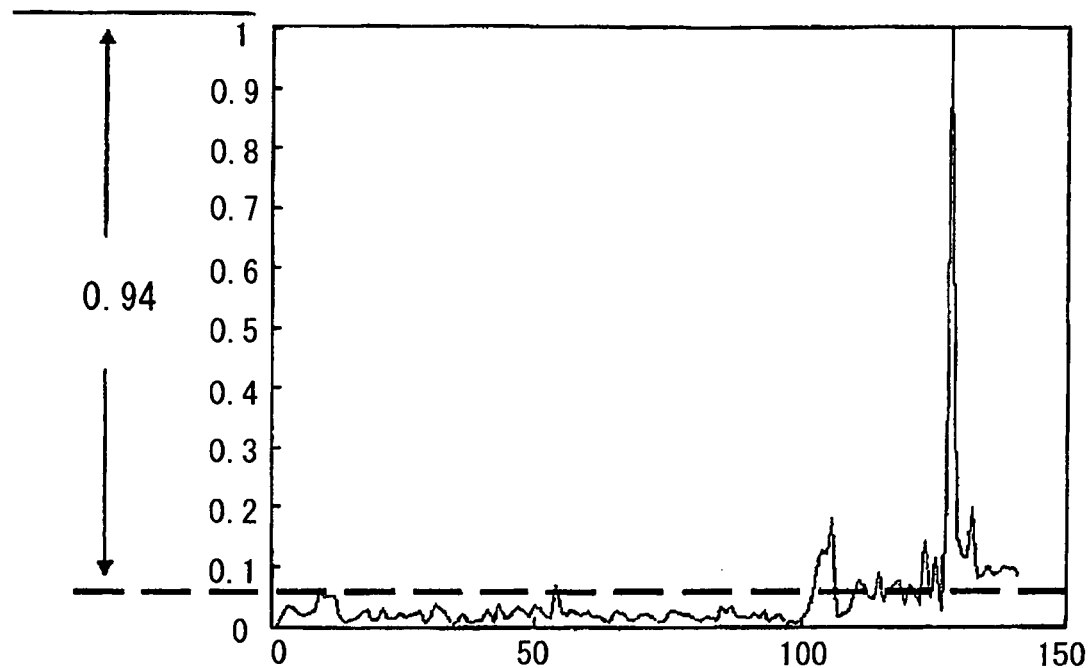
FIGS. 3A and 3B illustrate how the similarity factor calculated through template matching may change as the search frame B is shifted within a specific range in the target image I.
Figure 3B:
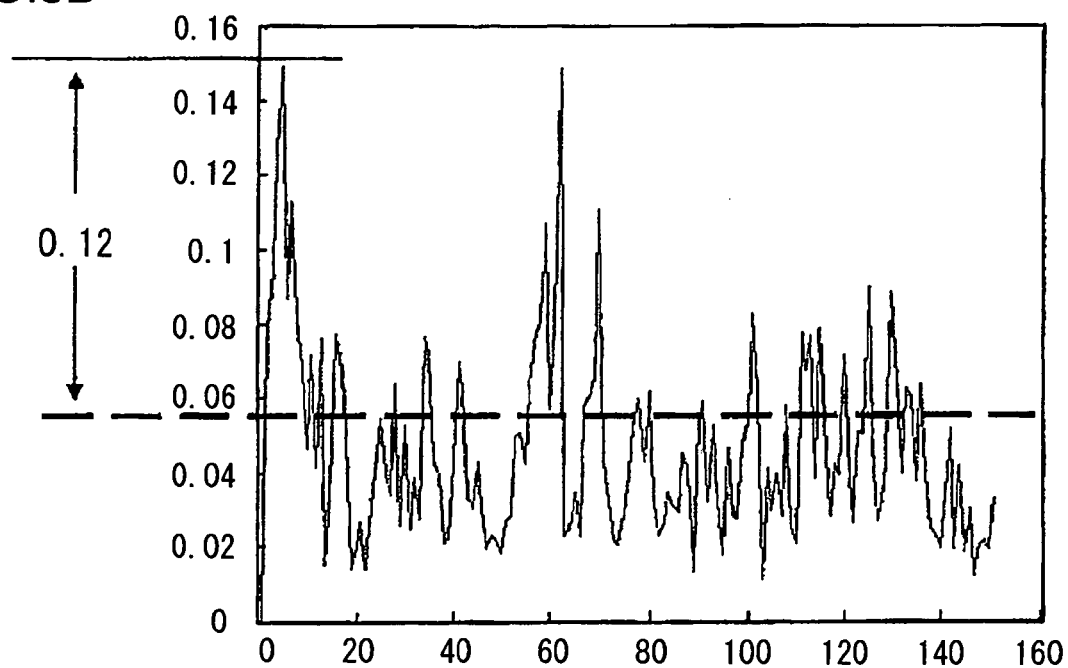

FIGS. 3A and 3B illustrate how the similarity factor calculated through a template matching process executed by shifting the search frame B within a specific range in the target image I may change. In FIGS. 3A and 3B, the similarity factor is indicated along the vertical axis and the number of calculation executions is indicated along the horizontal axis. Namely, the figures present the results obtained by plotting the similarity factor calculated each time a template matching is executed as the search frame B is shifted and the template matching is executed multiple times. It is to be noted that the similarity factor indicated along the vertical axis takes on normalized numerical values within the range of 0 and 1 and in the description of the embodiment, a value within the range of 0 through 1, indicating the level of similarity, is referred to as a similarity factor value. When the similarity factor value is closer to 0, the level of similarity is lower and when the similarity factor value is closer to 1, the level of similarity is higher.

For instance, if the similarity factor has changed as shown in FIG. 3A through the template matching process, the position assumed by the search frame B in the target image I when a point 3*a* achieving the highest similarity factor value is calculated, is determined as the photographic subject position. If, on the other hand, the similarity factor has changed as shown in FIG. 3B, the position assumed by the search frame B in the target image I when a point 3*c* achieving the highest similarity factor value is calculated, is determined as the photographic subject position.

Comparison of the results presented in FIG. 3A and the results presented in FIG. 3B indicates that while the similarity factor value (highest similarity factor value) at the point 3*a* is markedly high with a significant difference of 0.94 from the similarity factor value average (similarity factor candidate average) 3*b* in FIG. 3A, the highest similarity factor value at the point 3*c* in FIG. 3B is not markedly higher than the other similarity factor values with a small difference of 0.12 relative to the similarity factor candidate average 3*d*. This means that while the photographic subject position determined based upon results such as those shown in FIG. 3A can be assumed to be highly reliable, the reliability of the photographic subject position determined based upon results such as those shown in FIG. 3B can be assumed to be low.

The template matching unit 104*a* in the embodiment judges the reliability of the photographic subject position having been determined to be high if the relationship expressed in (3) below is satisfied and judges that the reliability is low if the relationship in (3) is not satisfied.

|highest similarity factor value−similarity factor candidate average|>threshold value  (3)

Upon judging that the photographic subject position having been determined is highly reliable, the template matching unit 104*a* designates the range matching the search frame B corresponding to the photographic subject position, as a range within which the photographic subject is present in the target image I. The photographic subject tracking unit 104*b* then displays a target frame indicating the range, within which the subject is present over the frame, allowing the user to ascertain the position at which the photographic subject is present in the frame.

If, on the other hand, the reliability of the photographic subject position having been determined is judged to be low, the photographic subject tracking unit 104*b* does not display a target frame in correspondence to the photographic subject position and the template matching unit 104*a* shift into template matching for the next frame. Namely, upon judging that the reliability of the photographic subject position having been determined is low, the photographic subject tracking unit 104*b* disqualifies the particular photographic subject position as the photographic subject tracking target.

As the processing described above is executed on each through image frame that is input, the photographic subject can be tracked from frame to frame by displaying the target frame containing the tracking target only if the high level of similarity is achieved at the corresponding photographic subject position determined through the template matching process executed by the template matching unit 104*a*.

FIG. 4 presents a flowchart of the processing executed in the camera 100 in the first embodiment. The processing in FIG. 4 is executed by the control device 104 based upon a program which is started up as a through image input from the image sensor 103 starts.

In step S1, the template matching unit 104*a* reads a first through image frame and then the operation proceeds to step S2. In step S2, the template matching unit 104*a* extracts the template image A from the first frame having been read, based upon an instruction issued by the user. Subsequently, the operation proceeds to step S3.

In step S3, the template matching unit 104*a* reads the next through image frame and then the operation proceeds to step S4. In step S4, the template matching unit 104*a* calculates the photographic subject position through the similarity factor calculation executed by matching the images within the search frame B at various positions against the template image A as the search frame B is shifted within a predetermined range in the target image I as explained earlier. Subsequently, the operation proceeds to step S5.

In step S5, the template matching unit 104*a* makes a decision as to whether or not the reliability of the photographic subject position having been determined is high in reference to expression (3). If the reliability is judged to be low, the operation returns to step S3 to read the next frame. If, on the other hand, the reliability is judged to be high, the operation proceeds to step S6 in which the photographic subject tracking unit 104*b* displays the target frame indicating the range within which the photographic subject is present over the current frame. The operation then proceeds to step S7.

In step S7, the template matching unit 104*a* selects various parameter settings required for the template matching of the subsequent frame. For instance, it may select a search area parameter setting to specify the position or the areal size of the range (search range) over which the search frame B is to be shifted in the next frame, in correspondence to the similarity factor value calculated at the determined photographic subject position.

In more specific terms, if the similarity factor value having been calculated at the determined photographic subject position is high, the likelihood of having identified the photographic subject properly is high and accordingly, the search area parameter is set for the next frame so as to search over a smaller range centered on the determined subject position. If, on the other hand, the reliability of the similarity factor having been calculated at the determined photographic subject position is low, the photographic subject may have been missed and accordingly, the search area parameter is set for the next frame so as to search over a greater range centered on the determined photographic subject position. The operation then proceeds to step S8.

In step S8, the template matching unit 104*a* makes a decision as to whether or not the through image input has ended. If a negative decision is made, the operation returns to step S3, in which the template matching unit 104*a* reads the next frame. If, on the other hand, an affirmative decision is made, the processing ends.

The following advantages are achieved in the first embodiment described above.

(1) As the search frame is shifted within the search target area set in each of input image frames input sequentially, template matching is executed for the image in the search frame and the template image to calculate the similarity factor indicating the level of similarity between the image contained in the search frame assuming a specific search frame position and the template image. Then, a position in the input image contained in the search frame in correspondence to which the highest level of similarity has been calculated is determined as the photographic subject position and the reliability of the similarity factor at this photographic subject position is judged. If the reliability of the similarity factor calculated for the photographic subject position is judged to be low, the photographic subject position having been determined in the frame is disqualified as a photographic subject tracking target. As a result, the target frame is displayed only at a photographic subject position achieving a high level of similarity factor reliability, which, in turn, enables highly accurate photographic subject tracking.

(2) The reliability of the similarity factor is judged as expressed in (3). Namely, if the absolute value of the difference between the highest similarity factor value and the average of similarity factor values calculated for the images in the search frame assuming various search frame positions relative to the template image is greater than the predetermined threshold value, the reliability of the similarity factor calculated for the photographic subject position is judged to be high. However, if the absolute value is equal to or less than the predetermined threshold value, the reliability of the similarity factor calculated for the photographic subject position is judged to below. Since this allows the similarity factor reliability to be judged in a uniform manner, the processing can be simplified.

-Second Embodiment-

In the first embodiment described above, if the reliability of the photographic subject position having been determined is judged to be low through the decision-making expressed in (3), the template matching unit 104*a* proceeds to process the next frame without displaying the target frame at the particular photographic subject position. In other words, if the reliability of the photographic subject position having been determined is judged to be low, the particular photographic subject position is disqualified as a photographic subject tracking target.

The template matching unit 104*a* in the second embodiment differs from the template matching unit in the first embodiment in that even when the reliability of the photographic subject position having been determined is judged to be low through the decision-making expressed in (3), it displays the target frame at the photographic subject position having been determined in the current frame and designates the photographic subject position as the photographic subject tracking target. The template matching unit 104*a* then resets the search area parameter having been described earlier to search over a greater range in order to improve the reliability of the photographic subject position to be determined in the following frame. It is to be noted that since the aspects of the first embodiment having been described in reference to FIGS. 1 through 3 also apply to the second embodiment, a repeated explanation thereof is not provided.

Figure 5:
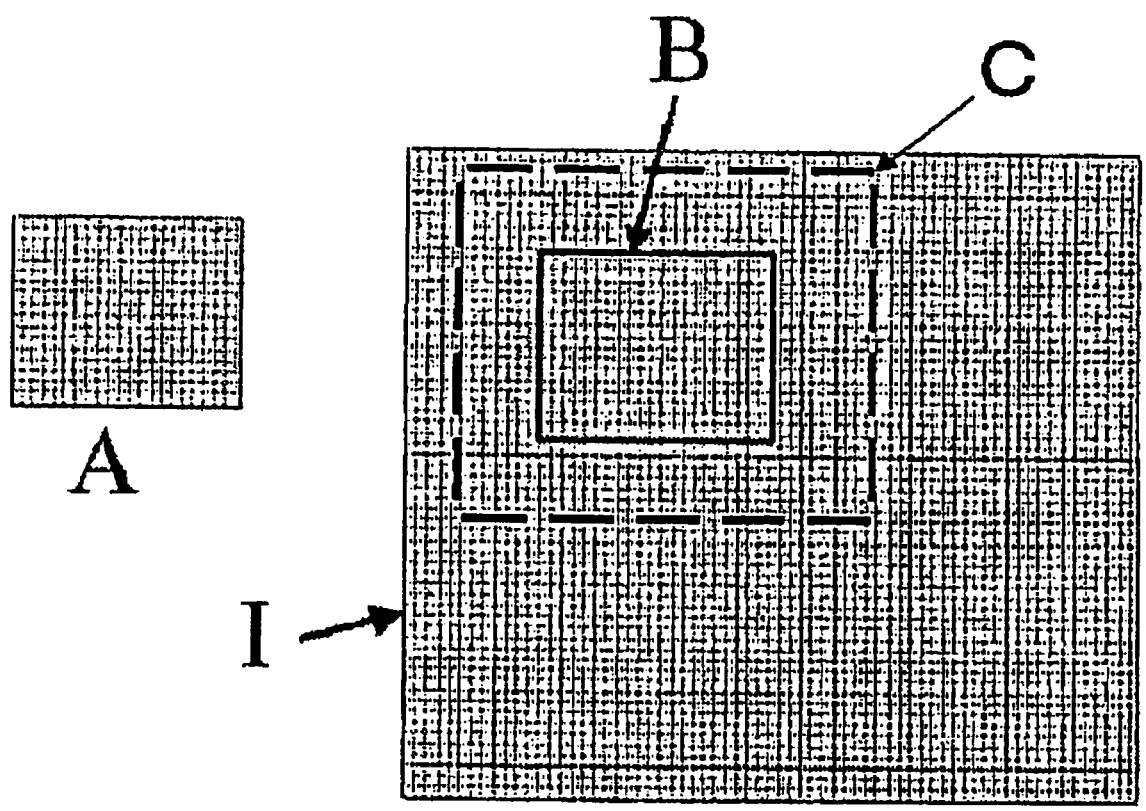
FIG. 5 illustrates how the search target area may be set in a second embodiment.

To explain the second embodiment in further detail, the template matching unit 104*a* enlarges the search target area over which the target frame B is shifted in the target image I if the reliability of the determined photographic subject position is judged to be low. For instance, it may set a search target area C within the target image I as shown in FIG. 5. At this time, the template matching unit 104*a* may expand the search target area at a predetermined ratio or it may adjust the expansion rate for the search target area in correspondence to the similarity factor value calculated for the photographic subject position.

Figure 6:
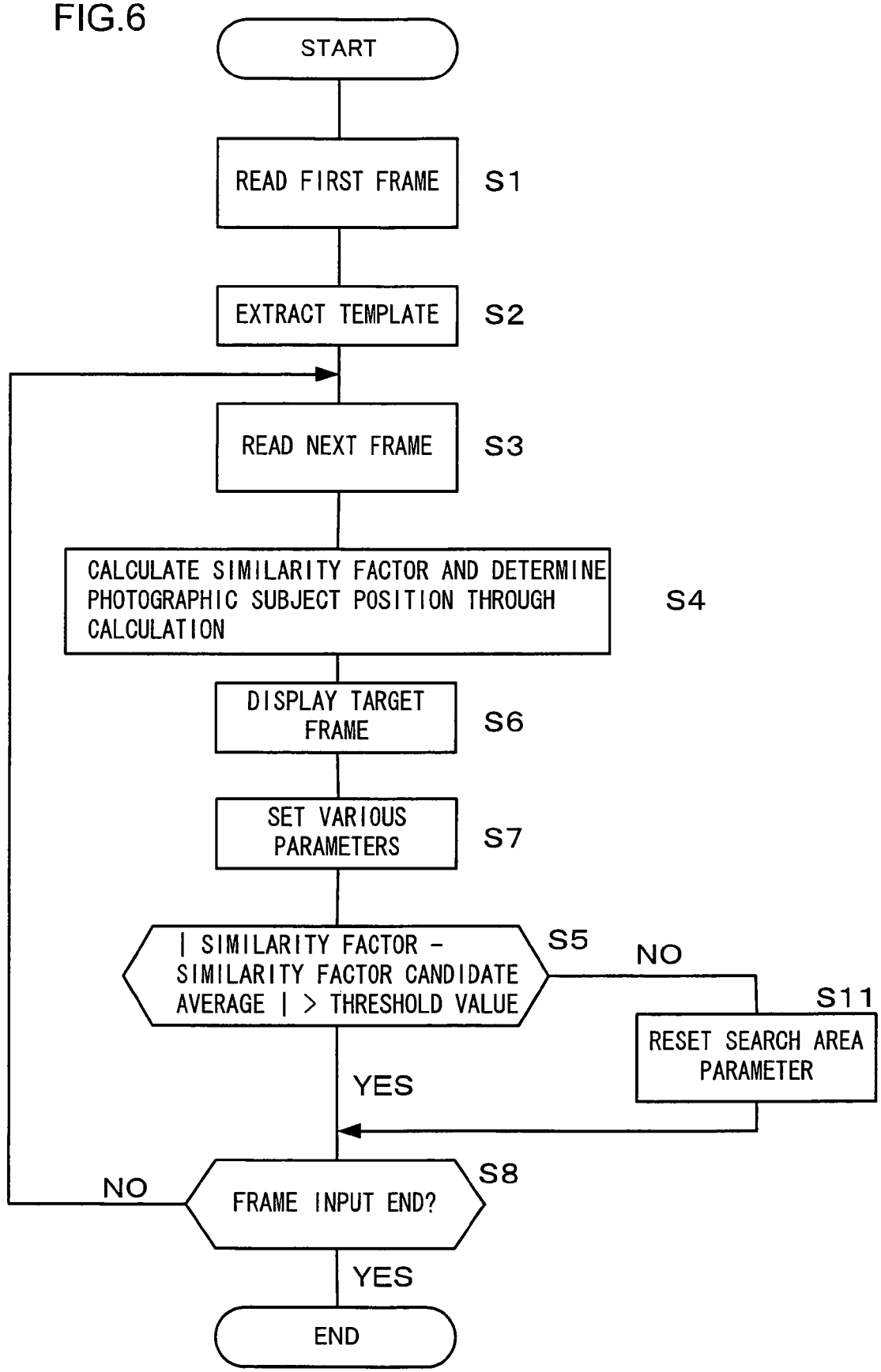
FIG. 6 presents a flowchart of the processing executed in the camera 100 in the second embodiment.

FIG. 6 presents a flowchart of the processing executed in the camera 100 in the second embodiment. The processing in FIG. 6 is executed by the control device 104 based upon a program which is started up as a through image input from the image sensor 103 starts. It is to be noted that the same step numbers are assigned to steps in which processing identical to that in FIG. 4 in reference to which the first embodiment has been described is executed and the following explanation focuses on the difference from the first embodiment.

In step S4, the template matching unit 104*a* determines the photographic subject position through the similarity factor calculation executed as explained earlier. The template matching unit 104*a* in this embodiment determines the range corresponding to the search frame B set at the photographic subject position as the range containing the photographic subject in the target image I, regardless of the level of reliability of the photographic subject position having been determined. The operation then proceeds to step S6, in which the photographic subject tracking unit 104*b* displays the target frame indicating the range containing the photographic subject over the frame, before the operation proceeds to step S7.

In step S7, the template matching unit 104*a* selects the various parameter settings such as the search area parameter setting mentioned earlier required for the template matching for the next frame. Subsequently, the operation proceeds to step S5, in which the template matching unit 104*a* makes a decision based upon expression (3) as to whether or not the reliability of the photographic subject position having been determined is high. If the reliability is judged to be high, the operation proceeds to step S8.

If, on the other hand, the reliability is judged to be low, the operation proceeds to step S11 to reset the search area parameter having been set in step S7 based upon the similarity factor value calculated in correspondence to the photographic subject position. For instance, if the reliability of the similarity factor having been calculated at the determined photographic subject position is low, the photographic subject may have been missed and accordingly, a greater range centered on the determined photographic subject position needs to be searched in the next frame. Thus, the search area parameter should be set so that the search is executed over a greater range than the range having been set in step S7 under these circumstances. The operation then proceeds to step S8.

In addition to the advantages of the first embodiment, the following advantages are achieved through the second embodiment described above.

(1) The target frame is displayed at the photographic subject position having been determined even if the reliability of the similarity factor calculated in correspondence to the particular photographic subject position is low. Thus, the target frame is displayed over each through image frame regardless of whether the reliability is high or low, allowing the user to ascertain the change in the photographic subject position.

(2) If the reliability of the similarity factor calculated in correspondence to the photographic subject position having been determined is low, the search area parameter is reset. The photographic subject may have been missed when the reliability of the similarity factor calculated for the determined photographic subject position is low. Under such circumstances, the search must be executed over a greater range centered on the photographic subject position having been determined in the next frame. In the second embodiment, this concept is incorporated and the areal size of the search target area to be searched is optimized for the next frame.

-Third Embodiment-

In the first and second embodiment described above, the template matching unit 104*a* judges the reliability of the photographic subject position having been determined for the current frame to be low based upon the decision-making executed as expressed in (3). As an alternative, the absolute value of the difference between the average of the largest similarity factor values calculated in correspondence to search target area in previous frames and the largest similarity factor value in the search target area in the current frame is calculated and if the absolute value indicated in the calculation results is greater than a specific threshold value, the reliability of the photographic subject position having been determined in the current frame is judged to be high, whereas if the absolute value indicated in the calculation results is equal to or less than the predetermined threshold value, the reliability of the photographic subject position having been determined in the current frame is judged to be low in the third embodiment. If the reliability of the photographic subject position having been determined in the current frame is judged to be low, the template matching unit 104*a* expands the search target area in the current frame.

More specifically, as in the first and second embodiments, the template matching unit 104*a* sets the search frame B taking up an area the size of which is equal to the size of the template image, at a predetermined position in the target image I. The template matching unit 104*a* then executes matching calculation to match the images (search area images) within the search frame B taking up various positions against the template image A by shifting the search frame B within the target image I. It determines the photographic subject position indicated by specific coordinate values within the target image I corresponding to a match area containing an image within the search frame B achieving a highest level of similarity to the template image A, based upon the matching calculation results. It also calculates the similarity factor value at the particular photographic subject position. A new search frame B centered on the photographic subject position having been determined is then set and the matching calculation for the next frame is executed by using the newly set search frame B.

Figure 7:
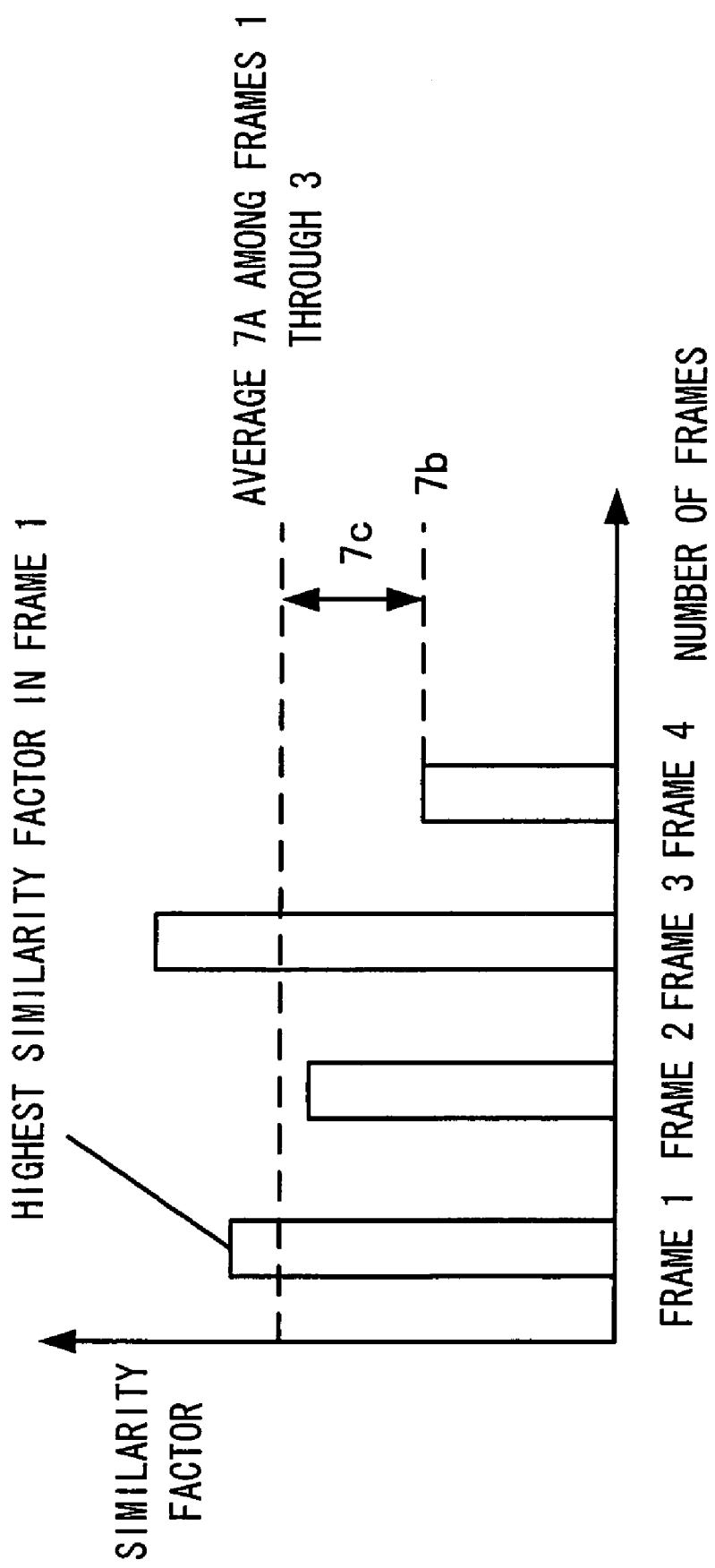
FIG. 7 shows a change in the similarity factor occurring from frame to frame, which may be observed in a third embodiment.

An explanation is now given on an example in which the largest similarity factor value has been calculated for the image in the fourth frame, as shown in FIG. 7. In this situation, the template matching unit 104*a* calculates the average value 7*a* of the largest similarity factor values having been calculated in correspondence to the three preceding frames and then calculates the absolute value 7*c* of the difference between the average value 7*a* and the largest similarity factor value 7*b* calculated for the image in the current frame (fourth frame). If the absolute value 7*c* representing the difference is greater than the predetermined threshold value, the reliability of the photographic subject position having been determined in the current frame is judged to be high. If, on the other hand, the absolute value 7*c* representing the difference is equal to or less than the predetermined threshold value, the reliability of the photographic subject position having been determined for the current frame is judged to be low.

Namely, the template matching unit 104*a* in the third embodiment judges the reliability of the determined photographic subject position to be high as long as the relationship expressed in (4) below is satisfied, but judges the reliability to be low if the relationship is not satisfied.

$$|\text{average of largest similarity factor values calculated for previous frames} - \text{largest similarity factor value calculated for current frame}| > \text{threshold value} \quad (4)$$

Figure 8:
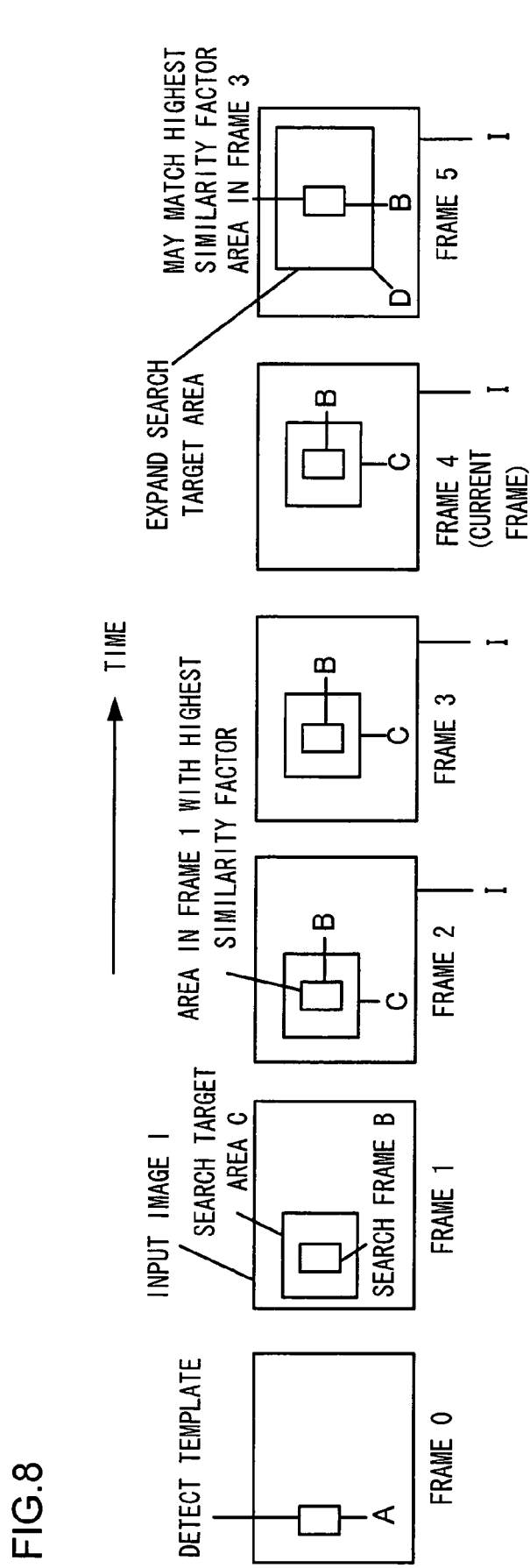
FIG. 8 illustrates how the search target area may be set in the third embodiment.

It the relationship in expression (4) is not satisfied and accordingly the reliability of the photographic subject position having been determined for the current frame is judged to be low, the template matching unit 104*a* executes the template matching process for the next frame (frame 5 in FIG. 8) over an expanded search target area, as shown in FIG. 8. The photographic subject position (the center of the search target area) set in the next frame may assume the same position as that taken in the preceding frame (frame 3 in FIG. 8).

An explanation is now given on an example in which the reliability of the photographic subject position having been determined for the current frame (fourth frame) is judged to be low through template matching executed by using the first through fourth (current) frames and setting the search target area C in each target image I. In this situation, the template matching unit 104*a* sets a new search target area D by expanding the search target area C in the current frame and then executes the template matching process for the next frame (frame 5) over the newly set search target area D.

Figure 9:
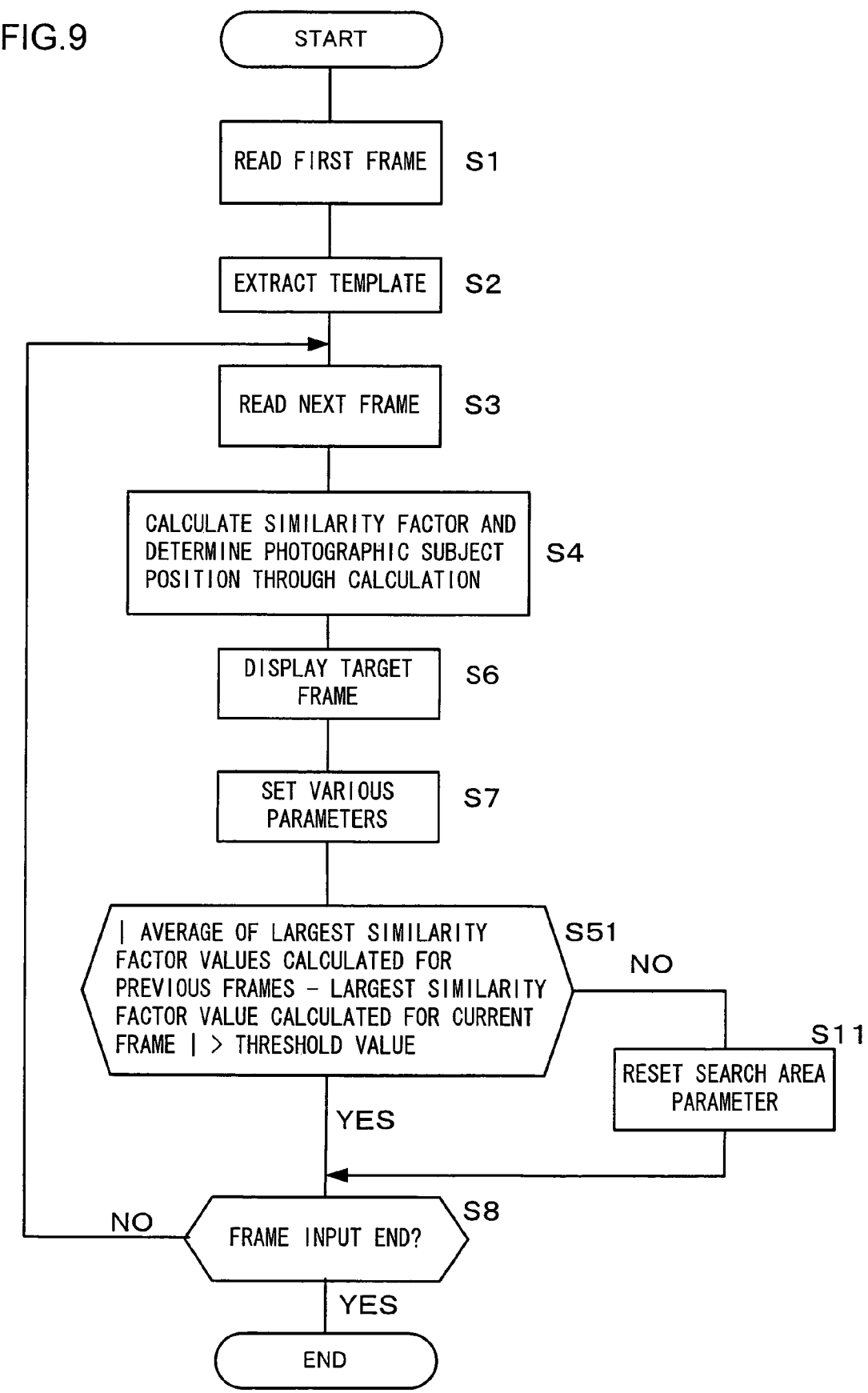
FIG. 9 presents a flowchart of the processing executed in the camera 100 in the third embodiment.

FIG. 9 presents a flowchart of the processing executed in the camera 100 in the third embodiment. The processing in FIG. 9 is executed by the control device 104 based upon a program which is started up as a through image input from the image sensor 103 starts. It is to be noted that the same step numbers are assigned to steps in which processing identical to that in FIG. 4 in reference to which the first embodiment has been described and FIG. 6 in reference to which the second embodiment has been described is executed and the following explanation focuses on the difference from the first and second embodiments.

In step S51, the template matching unit 104*a* makes a decision as to whether or not the reliability of the photographic subject position having been determined is high in reference to expression (4). If the reliability is judged to be high, the operation returns to step S6 in which the photographic subject tracking unit 104b displays the target frame over the range corresponding to the photographic subject position having been determined.

If, on the other hand, the reliability is judged to be low in step S51, the operation proceeds to step S11 in which the template matching unit 104a resets the search parameters so as to expand the search target area, before the operation proceeds to step S8.

In addition to the advantages of the first and second embodiments, the following advantage is achieved through the third embodiment described above. Namely, the absolute value representing the difference between the average of the largest similarity factor values having been calculated in correspondence to previous frames and the largest similarity factor value calculated for the current frame is determined, the absolute value is then compared with the threshold value and a decision is made as to whether the reliability of the photographic subject position having been determined for the current frame is high or low. Through these measures, the decision as to whether the reliability of the photographic subject position having been determined for the current frame is high or low can be made with a high level of accuracy based upon the similarity factor values having been calculated for the previous frames.

EXAMPLES OF VARIATIONS

It is to be noted that the photographic subject tracking device embodying the present invention described above allows for the following variations.

(1) In the second embodiment explained earlier, the target frame is displayed at the photographic subject position having been determined even if the reliability of the similarity factor calculated in correspondence to the particular photographic subject position is low and the search parameters to be used in template matching for the following frame are adjusted. Instead, the template matching unit 104a may reset the search parameters and re-execute the similarity factor calculation to recalculate the photographic subject position for the current frame by using the adjusted search parameters when the reliability of the similarity factor calculated for the initially determined photographic subject position is judged to below. The photographic subject tracking unit 104b may then display the target frame at the recalculated photographic subject position.

Figure 10:
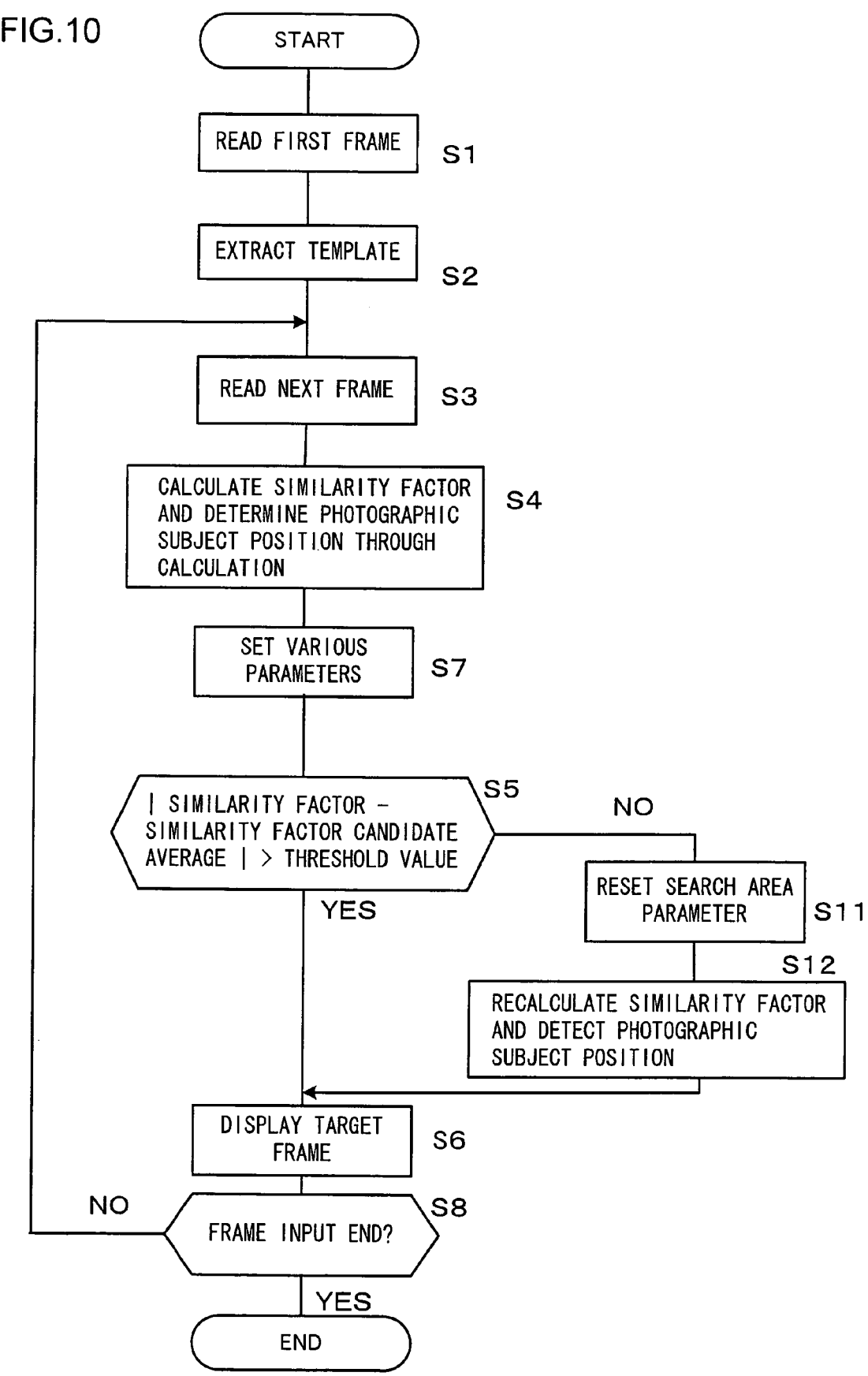
FIG. 10 presents a flowchart of the processing executed in the camera 100 in a variation.

More specifically, the control device 104 may execute the processing shown in FIG. 10. It is to be noted that the same step numbers are assigned in FIG. 10 to steps in which processing identical to that in FIG. 4, in reference to which the first embodiment has been described, FIG. 6, in reference to which the second embodiment has been described and FIG. 9, in reference to which the third embodiment has been described is executed. As shown in FIG. 10, the template matching unit 104a makes a decision in step S5 as to whether or not the reliability of the photographic subject position having been determined is high based upon expression (3). If the reliability is judged to be high, the operation proceeds to step S6 in which the photographic subject tracking unit 104b displays the target frame over the range corresponding to the determined photographic subject position.

If, on the other hand, it is decided in step S5 that the reliability is low, the operation proceeds to step S11 in which the template matching unit 104a resets the search parameters so as to expand the search target area and then the operation proceeds to step S12. In step S12, the template matching unit 104a re-executes the similarity factor calculation and recalculates the photographic subject position for the current frame by using the adjusted search parameters. Subsequently, the operation proceeds to step S6 in which the photographic subject tracking unit 104b displays the target frame over the range corresponding to the newly determined photographic subject position.

Since the search area parameter is adjusted and the template matching is re-executed if the reliability of the photographic subject position having been initially determined through the template matching executed for the current frame is judged to be low, the photographic subject tracking accuracy is improved.

Figure 11:
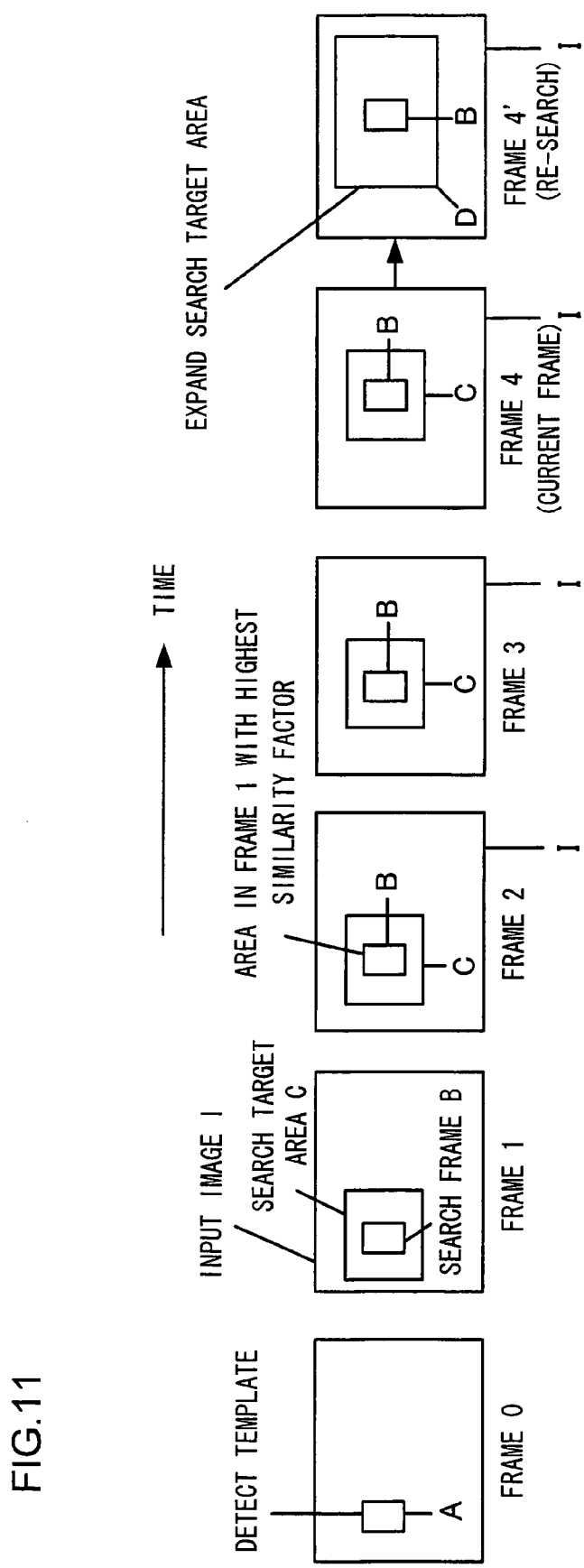
FIG. 11 illustrates how the search target area may be set in a variation.

The template matching may be re-executed after expanding the search target area in the current frame (frame 4 in FIG. B) in the third embodiment described above, as well. For instance, the template matching unit 104a may set a new search target area D greater than the search target area C in the current frame (frame 4) as shown in FIG. 11. Namely, it may set the search target area D as indicated in frame 4'. It may then re-execute the template matching process for the current frame (frame 4') over the search target area D.

(2) If the template matching is re-executed over an expanded search target area in the current frame as in variation (1) explained above, the range having been searched through the first template matching session, i.e., the range having been searched through the processing executed in step S4, does not need to undergo the processing again. In other words, the subsequent search only needs to be executed over the range that has not undergone the initial template matching session, i.e., only over the area expanding beyond the initial search target area.

Figure 12A:
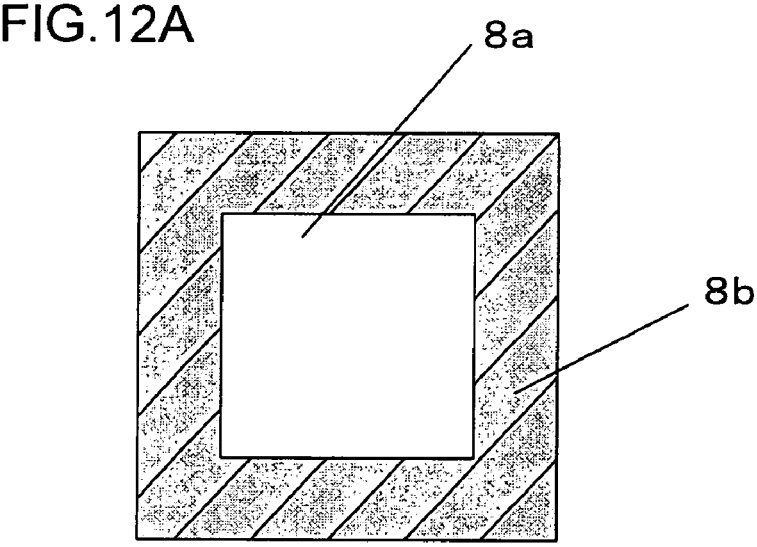
FIGS. 12A and 12B illustrate how the search frame may be shifted within the search target area in a variation.
Figure 12B:
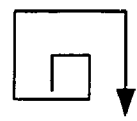

For instance, assuming that the search target area set for the initial template matching session is the range 8a in FIG. 12A and that the expanded range set for the subsequent search includes the additional range 8a and the range 8b, the search only needs to be re-executed over the search area range 8b. More specifically, the template matching unit 104a needs to execute template matching by shifting the search frame B in a spiral pattern from the outside of the re-search range (8a+ 8b) and stop the processing immediately before the search frame B enters the range 8a.

(3) An explanation has been given in reference to the third embodiment on an example in which the template matching unit 104a compares based upon expression (4) the absolute value of the difference between the average of the largest similarity factor values within the search target areas in the previous frames and the largest similarity factor value in the search target area set in the current frame with the threshold value in order to judge the reliability of the photographic subject position having been determined in the current frame. However, if the largest similarity factor values calculated for the previous frames include a similarity factor value with a low level of reliability, i.e., a largest similarity factor value less than a predetermined value, the average value of the largest similarity factor values within the search target area set in the previous frames may be calculated by excluding the similarity factor value with the low reliability. Through these measures, the accuracy of the decision made with regard to the reliability of the photographic subject position having been determined for the current frame can be improved.

(4) In reference to the first through third embodiments, an example in which the photographic subject tracking device is embodied as a camera and the photographic subject is tracked in through images has been explained. However, if the camera 100 has a dynamic image capturing function, template matching may be executed for the individual frames constituting a dynamic image having been photographed and the photographic subject may be tracked through the frames constituting the dynamic image. In addition, a program enabling the execution of the processing shown in FIG. 4, FIG. 6 or FIG. 7 may be recorded in another device such as a personal computer capable of reproducing dynamic images and photographic subject tracking may be executed on the personal computer as it executes the program.

Figure 13:
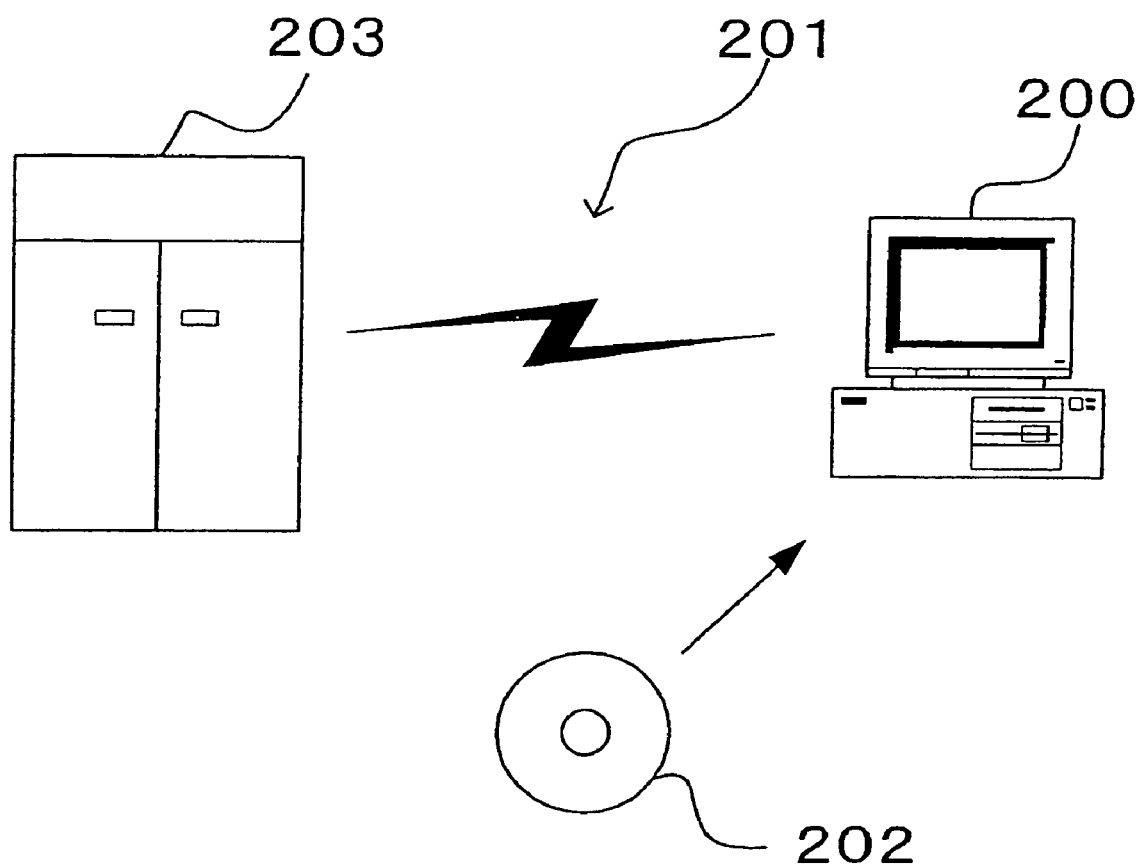
FIG. 13 illustrates how the photographic subject may be tracked on a personal computer.

The program enabling a personal computer or the like to execute a photographic subject tracking process according to the present invention as described above may be provided via a recording medium such as a CD-ROM or an electrical communication line such as the Internet. FIG. 13 illustrates how such a program may be provided. A personal computer 200 receives the program via a CDROM 202. The personal computer 200 is also capable of connecting with a communication line 201 via which the program provided by a server 203 can be received. The communication line 201 may be a communication line for Internet communication, personal computer communication or the like, or it may be a dedicated communication line. The server 203 transmits the program to the personal computer 200 via the communication line 201. Namely, the program, converted to a data signal on a carrier wave, is transmitted from the server 203 via the communication line 201. The program can thus be distributed as a computer-readable computer program product adopting any of various modes including a recording medium or a carrier wave.

It is to be noted that as long as the functions characterizing the present convention are not compromised, the present convention is not limited in any way whatsoever to the structural details assumed in the embodiments described above.

What is claimed is:

1. A photographic subject tracking method comprising:
   calculating similarity levels of images input sequentially to a template image;
   determining a photographic subject position in each of the input images based upon the similarity levels;
   tracking the photographic subject position through the input images;
   judging whether reliability of the similarity level calculated for the photographic subject position is high or low; and
   changing ways of at least one of calculating the similarity levels, determining the photographic subject position and tracking the photographic subject position, if the reliability of the similarity level is judged to be low, wherein:
   the similarity levels are calculated by setting a search target area in each of the input images, shifting a search frame to a plurality of positions within the search target area and calculating similarity levels of images within the search frame at each of the positions to the template image;
   the photographic subject position is determined to be at a position of the search frame at which a highest similarity level is calculated;
   if an absolute value of a difference between an average of the similarity levels and the highest similarity level is greater than a predetermined threshold value, the reliability is judged to be high, and if the absolute value of the difference is equal to or less than the threshold value, the reliability is judged to be low; and
   if the reliability is judged to be low:
   an areal size of the search target area over which the search frame is to be shifted is adjusted in correspondence to the similarity level calculated for the photographic subject position;
   the similarity level is recalculated through template matching of the image within the search frame and the template image executed by shifting the search frame within the search target area with the adjusted areal size set within a current input image; and
   a position of the search frame with a highest recalculated similarity level within the input image is designated as the photographic subject position.

2. A non-transitory computer-readable medium that stores a program for executing a photographic subject tracking method according to claim 1.

3. A photographic subject tracking method comprising:
   calculating similarity levels of images input sequentially to a template image;
   determining a photographic subject position in each of the input images based upon the similarity levels;
   tracking the photographic subject position through the input images;
   judging whether reliability of the similarity level calculated for the photographic subject position is high or low; and
   changing ways of at least one of calculating the similarity levels, determining the photographic subject position and tracking the photographic subject position, if the reliability of the similarity level is judged to be low, wherein;
   the similarity levels are calculated by setting a search target area in each of the input images, shifting a search frame to a plurality of positions within the search target area and calculating similarity levels of images within the search frame at each of the positions to the template image;
   the photographic subject position is determined to be at a position of the search frame at which a highest similarity level is calculated;
   if an absolute value of a difference between an average of largest similarity levels calculated with previous input images and a largest similarity level calculated with a current input image is greater than a predetermined threshold value, the reliability is judged to be high, and if the absolute value of the difference is equal to or less than the threshold value, the reliability is judged to be low; and
   if the reliability is judged to be low:
   an areal size of the search target area over which the search frame is to be shifted is expanded;
   the similarity level is recalculated through template matching of the image within the search frame and the template image executed by shifting the search frame within the enlarged search target area set within a current input image; and
   a position of the search frame with the highest recalculated similarity level within the input image is designated as the photographic subject position.

4. A non-transitory computer-readable medium that stores a program for executing a photographic subject tracking method according to claim 3.

5. A photographic subject tracking device comprising:
   a similarity level calculation unit that calculates similarity levels of images input sequentially to a template image;
   a photographic subject position determination unit that determines a photographic subject position in each of the input images based upon the similarity levels;

a photographic subject tracking unit that tracks the photographic subject position through the input images;
a reliability judgment unit that judges whether reliability of the similarity level calculated for the photographic subject position is high or low; and
a processing control unit that changes ways of at least one of the calculation of the similarity levels by the similarity level calculation unit, the determination of the photographic subject position by the photographic subject position determination unit and the tracking of the photographic subject position by the photographic subject tracking unit, if the reliability of the similarity level is judged to be low, wherein:
the similarity level calculation unit is configured to set a search target area in each of the input images, shift a search frame to a plurality of positions within the search target area, and calculate similarity levels of images within the search frame at each of the positions to the template image;
the photographic subject position determination unit is configured to determine the photographic subject position to be at a position of the search frame at which a highest similarity level is calculated;
the reliability judgment unit is configured to judge the reliability to be high if an absolute value of a difference between an average of the similarity levels and the highest similarity level is greater than a predetermined threshold value, and judge the reliability to be low if the absolute value of the difference is equal to or less than the threshold value, the reliability is judged to be low; and
if the reliability judgment unit judges the reliability to be low:
the similarity level calculation unit adjusts an areal size of the search target area over which the search frame is to be shifted in correspondence to the similarity level calculated for the photographic subject position;
the similarity level calculation unit recalculates the similarity level through template matching of the image within the search frame and the template image executed by shifting the search frame within the search target area with the adjusted areal size set within a current input image; and
the photographic subject position determination unit designates a position of the search frame with a highest recalculated similarity level within the input image as the photographic subject position.

6. A photographic subject tracking device comprising:
a similarity level calculation unit that calculates similarity levels of images input sequentially to a template image;
a photographic subject position determination unit that determines a photographic subject position in each of the input images based upon the similarity levels;
a photographic subject tracking unit that tracks the photographic subject position through the input images;
a reliability judgment unit that judges whether reliability of the similarity level calculated for the photographic subject position is high or low; and
a processing control unit that changes ways of at least one of the calculation of the similarity levels by the similarity level calculation unit, the determination of the photographic subject position by the photographic subject position determination unit and the tracking of the photographic subject position by the photographic subject tracking unit, if the reliability of the similarity level is judged to be low, wherein:
the similarity level calculation unit is configured to set a search target area in each of the input images, shift a search frame to a plurality of positions within the search target area, and calculate similarity levels of images within the search frame at each of the positions to the template image;
the photographic subject position determination unit is configured to determine the photographic subject position to be at a position of the search frame at which a highest similarity level is calculated;
the reliability judgment unit is configured to judge the reliability to be high if an absolute value of a difference between an average of largest similarity levels calculated with previous input images and a largest similarity level calculated with a current input image is greater than a predetermined threshold value, and judge the reliability to be low if the absolute value of the difference is equal to or less than the threshold value, the reliability is judged to be low; and
if the reliability judgment unit judges the reliability to be low:
the similarity level calculation unit expands an areal size of the search target area over which the search frame is to be shifted;
the similarity level calculation unit recalculates the similarity level through template matching of the image within the search frame and the template image executed by shifting the search frame within the enlarged search target area set within a current input image; and
the photographic subject position determination unit designates a position of the search frame with the highest recalculated similarity level within the input image as the photographic subject position.

* * * * *